United States Patent [19]
Kedem

[11] Patent Number: 5,968,184
[45] Date of Patent: Oct. 19, 1999

[54] MAINTENANCE COMMAND STRUCTURE AND EXECUTION

[75] Inventor: Ishai Kedem, Brookline, Mass.

[73] Assignee: EMC Corporation, Hopkinton, Mass.

[21] Appl. No.: 08/868,305

[22] Filed: Jun. 3, 1997

[51] Int. Cl.⁶ .............................. G06F 3/03; G11B 19/02
[52] U.S. Cl. ................................. 714/7; 714/6; 711/112; 711/114
[58] Field of Search .................... 395/182.05, 182.04; 711/112, 114; 714/6, 7

[56] References Cited

U.S. PATENT DOCUMENTS

| | | | |
|---|---|---|---|
| 5,463,758 | 10/1995 | Ottesen | 711/114 |
| 5,586,291 | 12/1996 | Lasker et al. | 711/113 |
| 5,740,358 | 4/1998 | Geldman et al. | 395/184.01 |
| 5,809,543 | 9/1998 | Byers et al. | 711/162 |
| 5,812,761 | 9/1998 | Seki et al. | 395/185.07 |

*Primary Examiner*—Ly V. Hua
*Attorney, Agent, or Firm*—Fish & Richardson P.C.

[57] ABSTRACT

A method and appartus maintain a disk drive system in a more reliable and simplified manner. Maintenance commands directed to logical volumes of the physical disk drive units are configured to apply to the entire physical disk drive unit so that a maintenance command need not be repeated for each logical volume to be affected. Should a failure be received with regard to any one or more logical volumes, the apparatus and method repeat the maintenance command, but only for those failed logical volumes. The maintenance command can also be applied to a group of physical devices using this procedure.

10 Claims, 3 Drawing Sheets

| COMMAND | FE | LV | SW1 | SW2 |

MAINTENANCE COMMAND STRUCTURE AND EXECUTION

BACKGROUND OF THE INVENTION

The invention relates generally to disk drive systems and in particular to maintenance on a larger scale disk drive system.

Disk drive systems have grown enormously in both size and sophistication in recent years. These systems can typically include many large disk drive units controlled by a complex multi-tasking disk drive controller such as the EMC Symmetrix disk drive controller. A large scale disk drive system can typically receive commands from a number of host computers and can control a large number of disk drive mass storage units, each mass storage unit capable of storing in excess of several gigabytes of data. There is every reason to expect that both the sophistication and size of the disk drive systems will increase.

As the systems grow in complexity, so also does the user's reliance upon the system, for fast and reliable recovery and storage of data. Thus, it is more than a mere inconvenience to the user should the disk drive system go "down" or off-line; and even should only one disk drive go off-line, substantial interruption to the operation of the entire system can occur. For example, a disk drive storage unit may be part of RAID array or may be part of a mirrored system. The resulting lost time can adversely affect a system throughput performance and perceived reliability. This is true even for normally scheduled maintenance wherein, with advance warning to the user, one or more disk drives can be placed off-line for a period of time.

Many disk drive systems, such as the EMC Symmetrix disk drive system rely upon large standardized buses to connect the host computer and the controller, and to connect the controller and the disk drive elements. Periodically, however, the protocol of the system bus must be upgraded to implement performance improvements, to fix discovered programming errors, and for other normal maintenance reasons. The effect of reprogramming the disk drive communications, for example, using a SCSI bus, can be significant. Having to take the drive off-line, load into it the new SCSI code, and then bring the drive back on-line can take substantial time. During this time, the drive is effectively isolated and unavailable for any other purpose. The result can be a significant disruption to the normal operation and performance of the overall computer system.

Typically, a single maintenance command is directed to a single logical volume on a physical disk drive device. Accordingly, as disk drive storage systems grow in size, and the number of logical volumes on a single physical device increases, it becomes increasing time consuming and cumbersome to provide a single command for each of the disk drive logical volumes. Furthermore, the repetitive nature of the commands sometimes leads to human error where one or more of the logical drives is not provided with the commands, for example when a physical device is to be taken off-line and/or replaced. Accordingly, it is desirable to ensure that such human errors do not occur.

SUMMARY OF THE INVENTION

In accordance with the invention, a single command can be employed to perform a routine maintenance, for example, on all logical volumes of a physical disk drive device. In essence, the command addresses the physical device as opposed to the logical volume. In a particular aspect of the invention, multiple physical devices can be addressed using a single command.

The invention relates, therefore, to a method for maintaining a disk drive system, having a controller for driving at least one physical disk drive unit, the physical disk drive unit having a plurality of logical volumes. The method features the steps of configuring a maintenance command directed originally to any one logical volume of a selected physical disk drive unit to apply to each logical volume of the physical disk drive unit; directing, using the controller, the maintenance command to any one identified logical volume of the selected disk drive unit; and automatically causing the maintenance command to be directed to each other logical volume of the selected disk drive unit.

In particular embodiments, the method features the steps of determining any failure mode in response to directing the maintenance command to the plural logical volumes and repeating the directing and automatically directing steps. The method then features limiting the step of directing the commands to only those logical volumes to which that maintenance command failed during a previous maintenance command operation.

The method further features the step of configuring the maintenance command to apply to each logical volume of a group of physical disk drive units, and in another aspect, setting a switch set option element of the maintenance command to cause it to affect the entire physical disk drive unit. The method can further feature recognizing a set switch option in the command at the controller, and repeatedly issuing the command from the controller to each logical volume of the selected physical disk drive unit.

The apparatus of the invention features a system for maintaining a disk drive system, the system having a disk drive controller for driving at least one physical disk drive unit, the disk drive unit having a plurality of logical volumes. The apparatus features a controller which can configure a maintenance command directed to any one logical volume of a selected physical disk drive unit to apply to each logical volume of the disk drive unit; directing, using the controller of the system, the maintenance command to any one volume of the disk drive unit; and automatically causing the maintenance command to be directed to each other logical volume of the selected disk drive unit.

The invention thus advantageously enables a single, logical volume command to be directed to all logical volumes of a physical disk drive or group of physical disk drives, thereby avoiding human error in sending the maintenance commands, which could lead to the irretrievable loss of data stored in the drive.

BRIEF DESCRIPTION OF THE DRAWING

Other features and advantageous of the invention will be apparent from the following description taken together with the drawings in which.

DESCRIPTION OF THE PREFERRED PARTICULAR EMBODIMENTS

Figure 1:
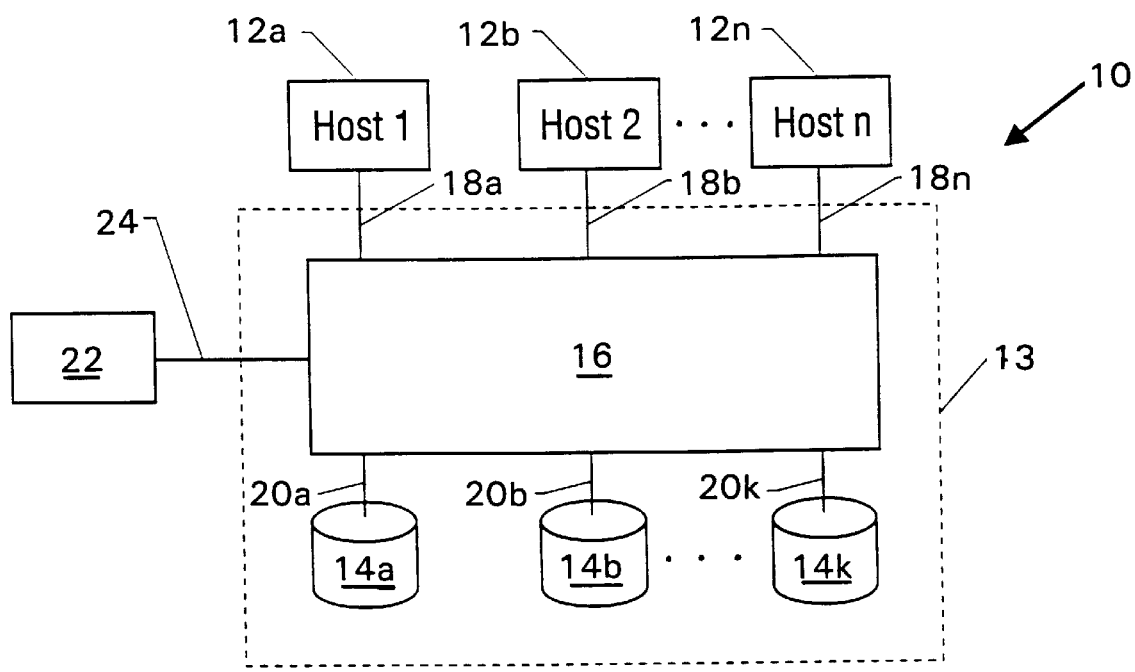
FIG. 1 is a schematic block diagram of a system in accordance with the invention.

Referring to FIG. 1, the invention relates to a computer system 10 which has a plurality of host computers 12*a*, 12*b*, ..., 12n and a mass storage system 13 having a plurality of physical disk drive elements 14a, 14b, ..., 14k. Interconnecting the host computers 12 and the disk drive elements 14 is a disk drive controller 16, for example, that made by EMC and known as the Symmetrix controller. The disk drive controller 16 receives memory commands from the various host computers over buses 18a, 18b, ..., 18n respectively, for example, connected and operating in accordance with a SCSI protocol, and delivers the data associated with those commands to the appropriate disk drive elements 14 over respective connecting buses 20a, 20b, ... 20k. Buses 20 also preferably operate in accordance with a SCSI protocol.

Each of the disk drive elements 14 typically has in excess of one gigabit of memory and is logically divided, in accordance with known techniques, into a plurality of logical volumes. Each disk drive element 14 can thus have a plurality of logical volumes, for example 4, 8, or more logical volumes on a single physical disk drive element. In a typical configuration, the controller system also connects to a console PC 22 through a connecting bus 24. Console PC 22 is used for maintenance and access to the controller and can be employed to set parameters of the controller as is well known in the art.

In operation of the disk drive system, it can often occur that a maintenance command which is applied to one logical volume of a physical device should also be applied to all logical volumes of at least that one physical disk drive device, and perhaps to a group of physical disk drive devices. For example, in preparing to take a disk drive off-line, the same command is typically sent to each logical volume. In accordance with the invention, the maintenance command, for example from the maintenance computer 22, can be configured to apply to each logical volume of a physical disk drive device, or group of devices, as desired. The system is particularly useful in connection with the Symmetrix disk drive controller system.

Figures 2, 4:
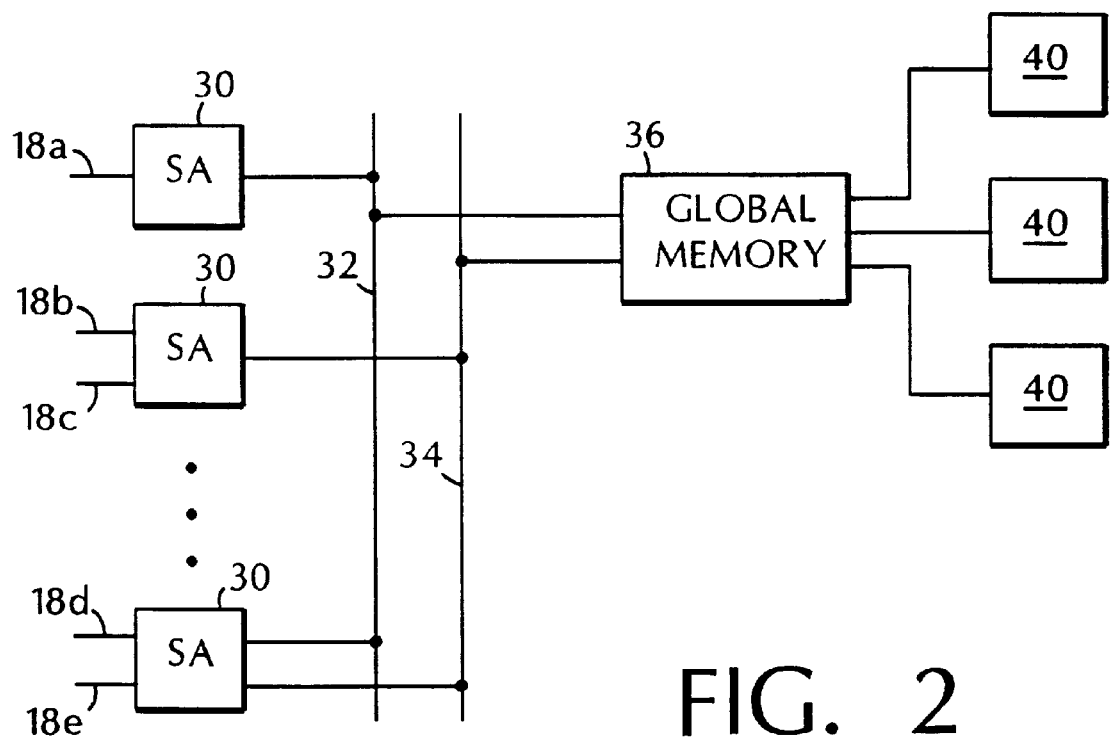
FIG. 2 is a schematic block diagram of a disk drive system in accordance with one aspect of the invention.
FIG. 4 is a representation of a command format in accordance with the invention.

Referring to FIG. 2, within a disk controller 16 to which the invention is particularly useful, each host computer connects to a channel director 30 (also referred to as a SCSI adapter) over SCSI bus lines 18. Each channel director, in turn, connects over one or more system buses 32 or 34 to a global memory 36. The global memory preferably includes a large cache memory through which the channel directors can communicate with the disk directors 40, which in turn, control the disk drives 14.

Figure 3:
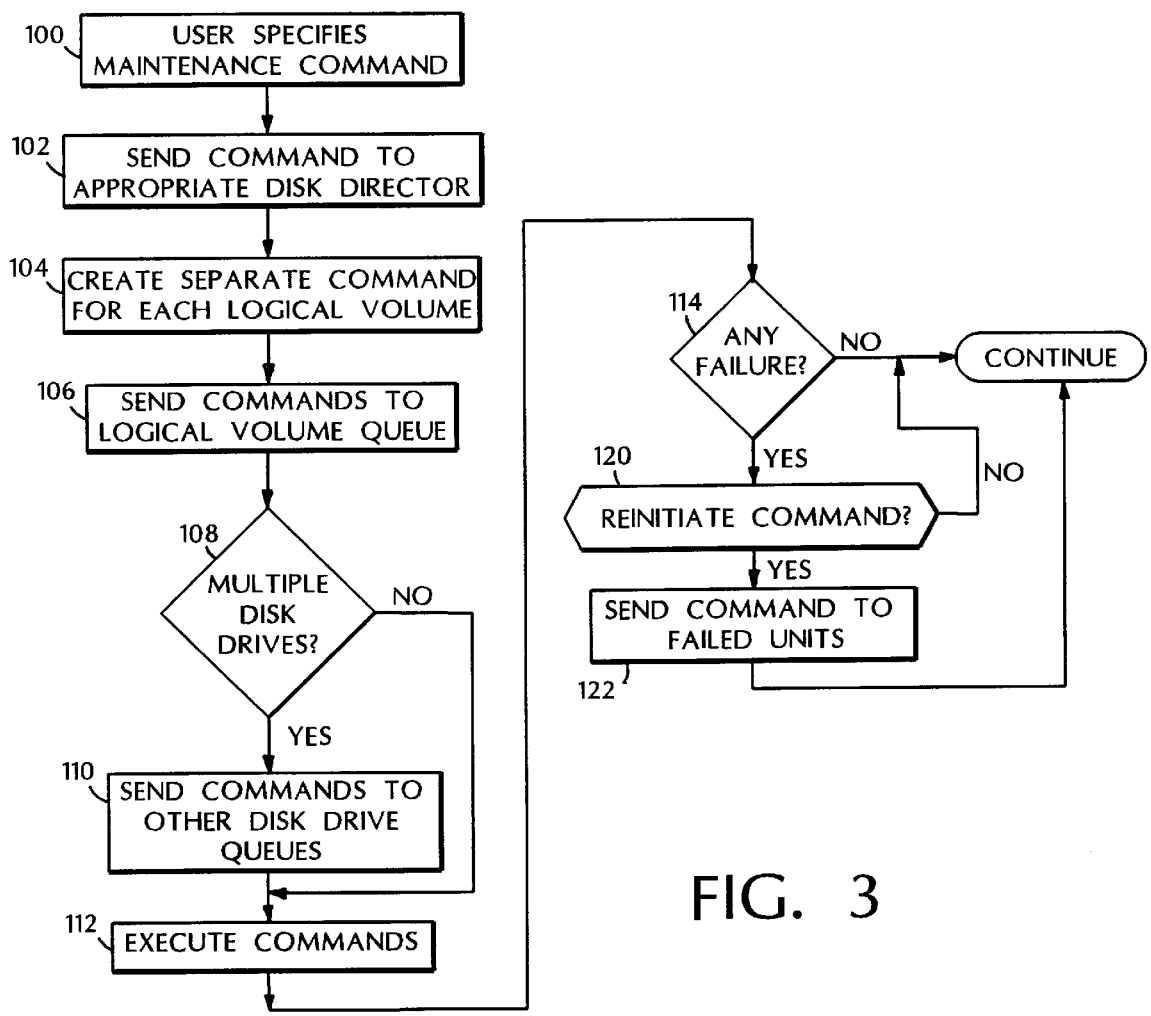
FIG. 3 is a flow chart illustrating operation in accordance with a preferred embodiment of the invention.

Referring to FIG. 3, in a preferred embodiment of the invention, in operation, the user through the maintenance PC 22 specifies at 100 in a maintenance command a logical volume to be affected and an option switch (Sw1) (FIG. 4) indicating whether the command should also be applied to each of the other logical volumes of the physical device. The command is then sent, at 102, to the appropriate disk director which reads the command and creates, at 104, a separate logical volume instruction for each of the logical volumes specified. In this manner, the command is reliably applied, at 108, to each logical volume, and if desired, a separate group switch can be used in the command to identify either groups of physical devices to which the command is to be applied or specific physical disk drive elements to which the command would be applied. In either instance, the disk director creates the necessary commands to effect the maintenance command at each logical volume of each affected physical disk drive element. The commands are put, at 110, into the command queue for each of the physical disk drive elements. Thereafter, the commands are executed, at 112, in order. If this is no failure, tested at 114, in executing any of the commands, the next maintenance or other commands in the command stack or queue for the disk drive are executed.

If, however, one or more failures have been detected for particular logical volumes in response to the maintenance command previously sent, the controller reinitiates the command, at 120, if called for by its protocol or, for example, the customer engineer. In this instance, however, the command is not sent, at 122, to all of the logical volumes but rather, as indicated at 122, is only sent to the logical volumes which reported a failure in execution. In this manner, while great flexibility and reliability is provided in making the commands available to all of the logical volumes of one or more physical disk drive devices, the command structure is not overwhelmed by repeating the entire sequence of commands, but rather, the commands are sent only to those logical volumes which, in effect, failed.

Referring to FIG. 4, there is illustrated a typical format for the maintenance command. The maintenance command illustrated in FIG. 4 provides for a specific identification of whether the command is directed to the entire physical device ("FE"), the first logical volume ("LV") to be affected, and a switch (SWI) to identify to whether the command is to be applied to every logical volume of the physical device. A group of disk drives (SW2) can also be specified.

In a preferred embodiment of the invention, this command structure is the same for all commands except those which are in no instance to be applied to all logical volumes of a physical device. This process also saves the user substantial time since each of the maintenance commands must otherwise be typed in, in the illustrated embodiment of the invention, by a human user.

For that reason, if a failure mode has been returned and the user, through the maintenance PC, repeats the command, the controller has the capability of recognizing the repeated command and applying it only to those volumes which in fact failed in response to a previous execution of that command.

Additions, subtractions, and other modifications of the claimed invention will be apparent to those practiced in this field and are within the scope of the following claims.

What is claimed is:

1. A method for maintaining a disk drive system having a controller for driving at least one physical disk drive unit, the physical drive unit having a plurality of logical volumes, the method comprising the steps of configuring a maintenance command directed to a first logical volume of a selected disk drive unit, to have a configuration identifying each logical volume of the selected disk drive unit to which to apply the command, directing, using the controller, the maintenance command to the first logical volume of the selected disk drive unit, and automatically causing the maintenance command to be directed to each other logical volume of said selected disk drive unit.

2. The method of claim 1 further comprising the steps of determining any failure made in response to directing said maintenance command to a logical volume, repeating said directing and automatically directing steps, and limiting the logical volumes to which said maintenance command will be repeated to those logical volumes at which that maintenance command failed during a previous maintenance command operation.

3. The method of claim 1 further comprising the step of configuring said maintenance command to cause the controller to apply the command to each logical volume of a group of physical disk drive units.

4. The method of claim 1 wherein said configuring step comprises the step of setting a switch option element of said maintenance command.

5. The method of claim 1 wherein said automatically causing step further comprises the steps of recognizing a switch set option in said maintenance command by said controller, and repeatedly issuing said command by said controller to each logical volume of said selected physical disk drive unit.

6. An apparatus for maintaining a disk drive system comprising a disk drive controller, at least one physical disk drive unit connected to the controller, each physical disk drive unit having a plurality of logical volumes, the controller including elements for configuring a maintenance command directed to a first logical volume of a selected physical disk drive unit to have a configuration identifying each logical volume of the selected disk drive unit to which to apply the command, directing, using the controller, the maintenance command to the first logical volume of the selected disk drive unit, and automatically causing the maintenance command to be directed to each other logical volume of the selected disk drive unit.

7. The apparatus of claim 6 further comprising the controller determining any failure mode in response to directing the maintenance command to a logical volume, and the controller directing and automatically directing elements to repeat their operations, and the controller automatically limiting the logical volumes to which the maintenance command will be repeated to those logical volumes at which the command failed during a previous maintenance command operation.

8. The apparatus of claim 6 further comprising the controller configuring the maintenance command to cause the controller to apply the command to each logical volume of a group of physical disk drive units.

9. The apparatus of claim 6 wherein said controller responds to a switch option element of the maintenance command.

10. The apparatus of claims 6 further wherein said controller recognizes a switch option in the maintenance command, and the controller repeatedly issues the maintenance command to each logical volume of said selected physical disk drive unit.

* * * * *